(12) United States Patent
Laforce et al.

(10) Patent No.: US 11,655,890 B2
(45) Date of Patent: May 23, 2023

(54) AXLE SYSTEM WITH A PLANETARY SUPPORT STRUCTURE

(71) Applicant: Dana Heavy Vehicle Systems Group, LLC, Maumee, OH (US)

(72) Inventors: Nicholas W. Laforce, Whitehouse, OH (US); Andrew T. Brammer, Toledo, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/652,053

(22) Filed: Feb. 22, 2022

(65) Prior Publication Data

US 2022/0268349 A1    Aug. 25, 2022

Related U.S. Application Data

(60) Provisional application No. 63/152,775, filed on Feb. 23, 2021.

(51) Int. Cl.
| | |
|---|---|
| *F16H 57/023* | (2012.01) |
| *F16H 57/08* | (2006.01) |
| *F16H 48/10* | (2012.01) |
| *F16H 57/02* | (2012.01) |

(52) U.S. Cl.
CPC ........... *F16H 57/023* (2013.01); *F16H 48/10* (2013.01); *F16H 57/082* (2013.01); *F16H 2057/02034* (2013.01); *F16H 2057/02052* (2013.01)

(58) Field of Classification Search
CPC ...... F16H 57/023; F16H 48/10; F16H 57/082; F16H 2057/02034; F16H 2057/02052; F16H 37/082; F16H 2057/02026; B60K 17/08; B60K 17/165; B60K 2001/001
See application file for complete search history.

(56) References Cited

U.S. PATENT DOCUMENTS

| | | | |
|---|---|---|---|
| 6,951,522 B2 | 10/2005 | Baxter, Jr. et al. | |
| 7,288,043 B2* | 10/2007 | Shioiri | F16H 9/125 |
| | | | 192/208 |
| 7,351,178 B2* | 4/2008 | Keuth | F16H 37/082 |
| | | | 475/221 |
| 7,670,242 B2 | 3/2010 | Bucknor et al. | |
| 8,070,638 B2 | 12/2011 | Phillips | |
| 8,998,765 B2* | 4/2015 | Sten | B60K 17/165 |
| | | | 475/221 |
| 9,777,816 B2 | 10/2017 | Petersen et al. | |
| 2015/0330492 A1 | 11/2015 | Lee et al. | |
| 2020/0215920 A1* | 7/2020 | Suyama | B60K 1/00 |
| 2021/0252977 A1* | 8/2021 | Engerman | B60K 17/354 |

FOREIGN PATENT DOCUMENTS

| | | | | |
|---|---|---|---|---|
| CN | 112644262 A | * | 4/2021 | ............... B60K 1/02 |
| DE | 102017104055 A1 | * | 9/2017 | ............... B60K 1/00 |
| JP | S6327207 B2 | * | 6/1988 | |
| JP | 2003127680 A | * | 5/2003 | |
| JP | 2012013184 A | * | 1/2012 | |
| WO | WO-2022089683 A1 | * | 5/2022 | |

* cited by examiner

*Primary Examiner* — Sherry L Estremsky
(74) *Attorney, Agent, or Firm* — McCoy Russell LLP

(57) ABSTRACT

An axle system is provided herein. In one example, the axle system includes a gearbox housing at least partially enclosing a gearbox and a planetary gearset that is rotationally coupled to an output of the gearbox and positioned co-axial with a rotational axis of an axle shaft in a differential. The planetary gearset includes a ring gear grounded by a planetary support that is attached to the gearbox housing.

18 Claims, 3 Drawing Sheets

AXLE SYSTEM WITH A PLANETARY SUPPORT STRUCTURE

CROSS REFERENCE TO RELATED APPLICATION

The present application claims priority to U.S. Provisional Application No. 63/152,775, entitled "AXLE SYSTEM WITH A PLANETARY SUPPORT STRUCTURE", and filed on Feb. 23, 2021. The entire contents of the above-listed application are hereby incorporated by reference for all purposes.

TECHNICAL FIELD

The present disclosure relates to an axle system with a planetary support that structurally grounds a ring gear in a planetary gearset.

BACKGROUND AND SUMMARY

Axle assemblies have incorporated gear reductions, such as planetary gearsets, that are attached to a differential to enhance drivetrain performance. In some designs, a gearbox housing may be profiled to directly ground the planetary gearset. Because the gearbox housing grounds the planetary assembly, the housing reacts the driving gear forces. The housing may therefore carry loads from the planetary assembly, which may demand additional gearbox housing reinforcement, in certain designs.

U.S. Pat. No. 9,777,816 B2 to Petersen et al. discloses an electric drive axle with a transmission and differential gearing unit. In the axle assembly, the electric motor is arranged coaxial to the differential gearing unit. The transmission includes a two-stage planetary gear reduction that is coupled to a spur gear differential. In the load stage, a ring gear is directly attached to the transmission's housing.

The inventors have recognized several drawbacks with Petersen's electric drive axle. For instance, attaching the ring gear directly to the gearbox housing may lengthen the axle's manufacturing duration due to the added complexity brought about by mounting the planetary gearset in the gearbox housing. Hence, previous gearbox designs have been encumbered by lengthy and convoluted manufacturing processes. Customer appeal of the axle may be reduced due to long manufacturing duration. Further, certain axle assemblies have been unable to achieve a relatively high gear ratio. Due to the lower gear ratio, the size and strength of the components upstream of the planetary gearset may be increased due to the higher torque transfer therethrough.

To address at least a portion of the abovementioned issues, the inventors have developed an axle system. The axle system includes, in one example, a gearbox housing that at least partially encloses a gearbox. The system further includes a planetary gearset rotationally coupled to an output of the gearbox. The planetary gearset is further positioned co-axial with an axle shaft in a differential. The planetary gearset includes a ring gear grounded by a planetary support that is coupled to the gearbox housing. In this way, the planetary gearset may be efficiently radially, axially, and rotationally supported using a reinforcement structure that is distinct from the gearbox housing. Consequently, the housing's structural complexity may be reduced, thereby simplifying manufacturing. Further, grounding the ring gear, allows the planetary gearset to achieve a comparatively high gear ratio, if wanted. The high gear ratio enables upstream components to be reduced in sized, if desired. This allows the size and weight of the axle system to be reduced thereby increasing the system's appeal and applicability.

Further, in one example, the planetary support includes a bridge section that extends between two opposing pillars which include central openings. The axle system further includes attachment devices that extend through the central openings of the two opposing pillars. Incorporating the bridge into the planetary support structure allows said structure to be strengthened while maintaining a relatively compact profile.

In yet another example, the gearbox housing may partially surround the differential. Shaping the housing in this manner allows the profile of the system to be further reduced and the packaging constraints imposed by the system on surrounding vehicle components to be reduced.

Still further in another example, the ring gear may be slip fit or splined into the planetary support. Both of these attachment techniques may simplify axle assembly, thereby increasing manufacturing efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An axle system with a planetary support that bolts or otherwise attaches to a gearbox housing is described herein. This planetary structure radially, axially, and rotationally supports a ring gear of a planetary reduction in a differential. By incorporating a fixed-ring planetary gearset into differential, a relatively high ratio can be achieved by the planetary gearset, if desired. This comparatively high gear ratio, allows upstream components to be downsized. The downsizing may result in a more space efficiency and lower cost axle assembly. Further, the planetary support serves to carry loads from the planetary reduction. Because of the support's load carrying capacity, the housing's structural complexity may be decreased, if wanted. In this way, the system's components may be tailored to meet anticipated loading in selected locations of the axle without unduly increasing the system's profile and weight, for instance. This in effect allows the system's structural features to be more granularly reinforced to decrease the chance of axle structural degradation. The planetary support structure may include a bridge that extends between two opposing columns. Bolts and/or other suitable attachment devices may extend through the columns, in one example. The bolts serve to attach the support to the gearbox housing which partially surrounds the differential. This allows the planetary support structure to be efficiently tied into the gearbox housing using a gearbox housing which is shaped to facilitate simplified installation of the structure, if so desired.

Figure 1:
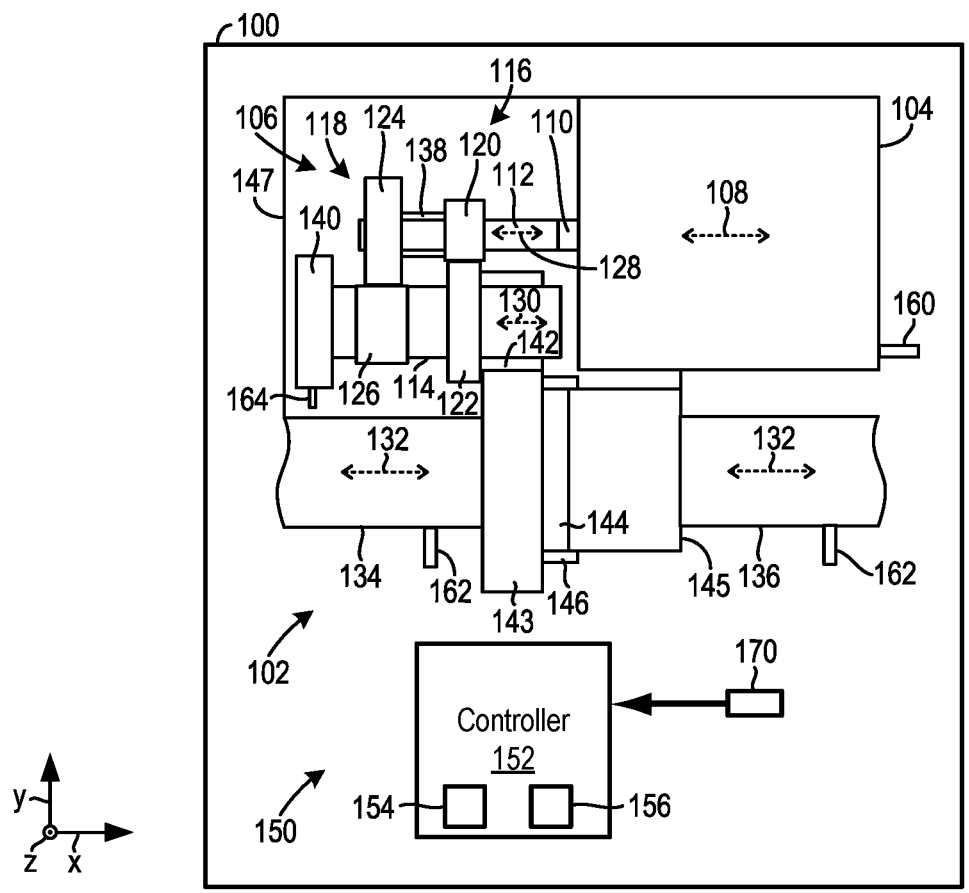
FIG. 1 is an illustration of a vehicle with an axle system.
Figure 2:
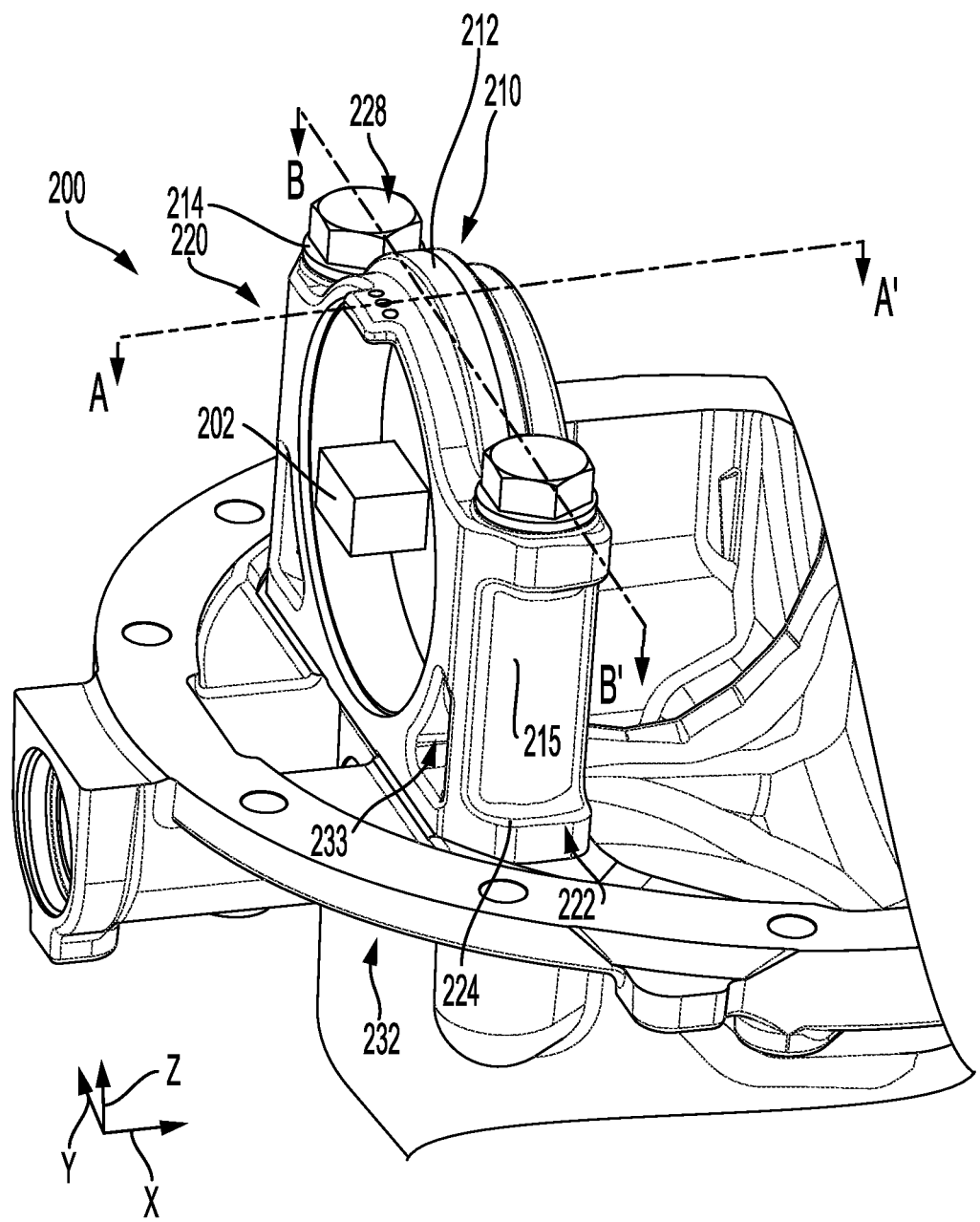
FIG. 2 is a perspective view of a first example of an axle system with a planetary gear reduction that is grounded by a planetary support.
Figure 3:
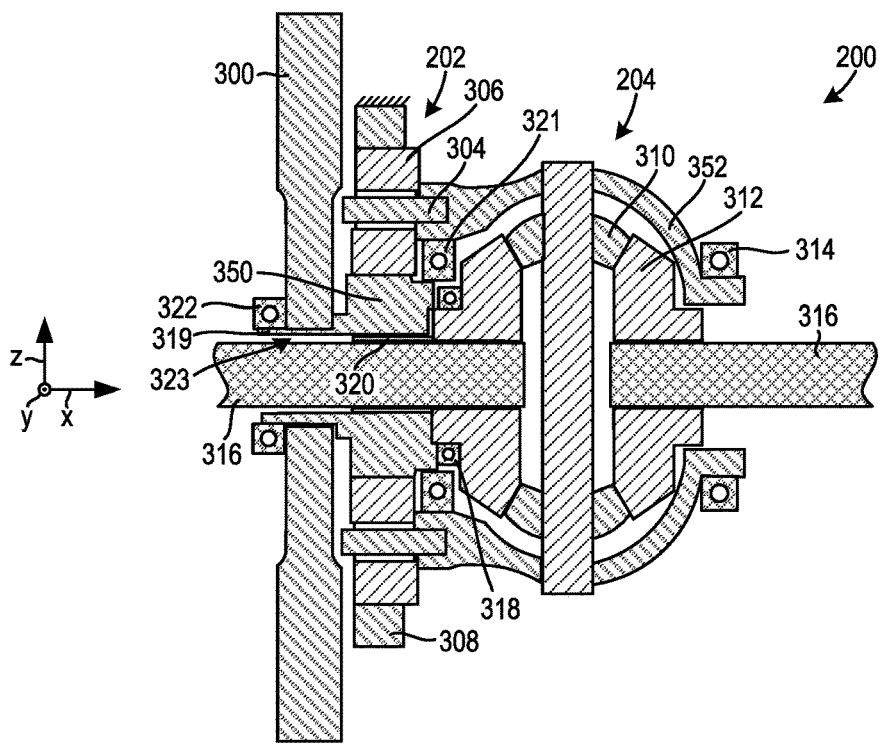
FIG. 3 is a first cross-sectional view of an axle system.
Figure 4:
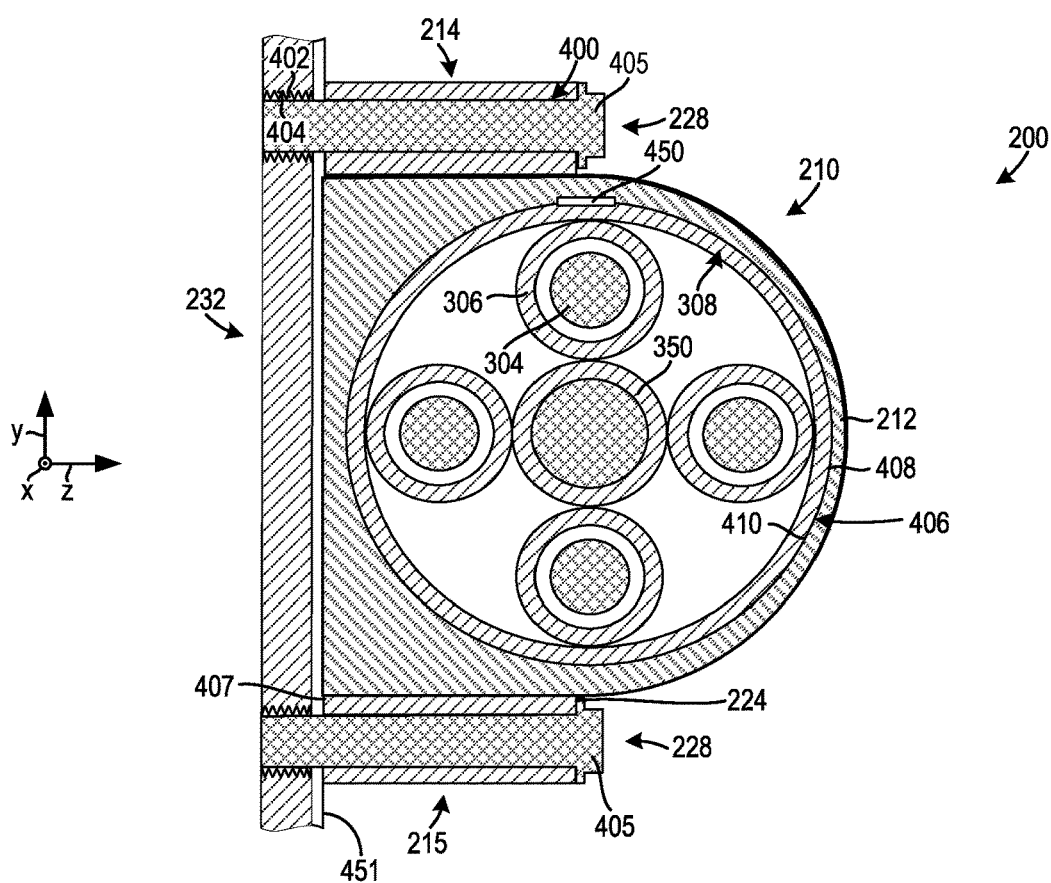
FIG. 4 is a second cross-sectional view of the axle system, depicted in FIG. 2.

FIG. 1 schematically illustrates a vehicle with an axle system that efficiently incorporates a planetary gearset into a differential. FIG. 2 shows a first example of an axle system with a planetary support structure that grounds a ring gear in a planetary assembly. FIG. 3 shows a first cross-sectional view of the axle system with a differential and the planetary gearset that is space efficiently packaged and structurally reinforced. FIG. 4 shows a second cross-sectional view of the axle system with the planetary gearset and the planetary support structure.

FIG. 1 shows a vehicle 100 with an axle system 102. The vehicle 100 may be a light, medium, or heavy duty vehicle that may be designed for on-road and/or off-road travel. The axle system 102 may include an electric machine 104 such as an electric motor or an electric motor-generator, in one example. Additionally or alternatively, the axle system may include an internal combustion engine coupled to a gearbox 106. Thus, in one example, the vehicle may be a battery electric vehicle (BEV) or a hybrid electric vehicle (HEV) that incorporates an electric motor and internal combustion engine. For instance, the vehicle may include another axle system with an internal combustion engine. Even further in other examples, the axle system 102 may be a non-steerable axle which, in certain cases, may be a solid beam axle, in vehicle where greater vehicle articulation, a relatively high load carrying capacity, and durability may be desired. However, axles with independent suspension systems have also been contemplated.

The electric machine 104 may include conventional components (e.g., a rotor, a stator, and the like) that electromagnetically interact to generate rotational energy and generate electrical energy, in some cases. The electric machine 104 may be a high voltage motor. For instance, the motor may be operated at a voltage equal to or greater than 24 Volts (V). For instance, the motor may be a 3-phase, 6-phase or 9-phase style motor. Nevertheless, numerous types of motors have been envisioned and may be selected based on vehicle performance targets, expected vehicle loads, gearbox range, and the like. The electric machine's rotational axis 108 is indicated for reference. Further, the electric machine 104 may be incorporated into the gearbox 106, in one example.

An output shaft 110 of the electric machine 104 is further illustrated in FIG. 1. The output shaft 110 is attached to the gearbox 106 which is included in the axle system 102. The gearbox 106 may be a shiftable gearbox with at least two selectable gears. However, other types of gearboxes have been contemplated, such as a fixed ratio gearbox or a continuously variable gearbox.

The gearbox 106 may include an input shaft 112 that is rotationally coupled to (e.g., splined, welded, fastened, press-fit, combinations thereof, and the like) the electric machine's output shaft 110. The gearbox 106 may further include an output shaft 114. In other instances, the gearbox may include a layshaft. The gearbox 106 is depicted with multiple selectable gear reductions 116, 118. These gear reductions may be first stage gear reductions. However, other gearbox arrangements with the selectable gear reductions arranged in downstream locations have been contemplated. The gear reduction 116 includes a gear 120 on the input shaft 112 coupled to a gear 122 on an output shaft 114. Likewise, the other selectable gear reduction 118 includes a gear 124 on the input shaft 112 coupled to a gear 126 on the output shaft 114. As described herein gears which are coupled to one another include teeth meshing with each other to facilitate rotational energy transfer therebetween. Although two gear reductions are specifically illustrated in FIG. 1, the gearbox may include additional gear reductions if end-use design goals demand additional available gear ratios.

Rotational axes 128, 130 of the input and output shafts 112 and 114, respectively are indicated for reference. Further, rotational axes 132 of axle shafts 134, 136, discussed in greater detail herein are further provided for reference. As illustrated, the axes 128, 130 are radially offset from one another and offset from the axle shafts 134, 136. Further, in one example, the rotational axis of the electric machine 104 and the input shaft 112 may be coaxial to decrease the longitudinal length of the system. In this way, the electric machine 104 may be space efficiently arranged in the system. Alternatively, the electric machine 104 may be arranged perpendicular to the input shaft, in certain vehicle systems.

The gearbox 106 may further include a shifting mechanism 138 designed to place the gear reductions 116, 118 in an activated state as well as a neutral state. In the activated state, power travels through the active gear reduction while the other gear reduction(s) remains inactive and power transfer through the other gear reduction does not occur. In this way, one of the selectable gear reductions may be placed in an active state. This shifting mechanism 138 may include a clutch (e.g., dog clutch, friction clutch, and the like), a shift fork, a piston, and the like to achieve the gear selection functionality. Further in one example, a power take-off (PTO) may be included in the gearbox at the end of the shaft 112.

The gearbox 106 may include a parking mechanism 140 or parking brake system designed to lock-up the gearbox and prevent rotation of the gearbox's input and output shafts. The parking mechanism 140 may include a pawl, a gear, rods, cams, and the like that enable the mechanism to implement gearbox locking and unlocking functionality.

Another gear 142 on the output shaft 114 may be rotationally coupled to an output gear 143 of the gearbox 106. However, alternate gearbox arrangements are possible. The output gear of the transmission may be arranged on the output shaft 114, for instance.

The output gear 143 may be rotationally coupled to a planetary gearset 144. Specifically, the output gear 143 may be coupled to a sun gear in the planetary assembly, in one example. Further, the planetary assembly's ring gear may be grounded by a planetary support and the carrier may be coupled to a case in a differential 145. Further, the planetary gearset may be a simple planetary gearset that includes solely a ring gear, a plurality of planet gears, a carrier, and a sun gear. In this way, the planetary may achieve a relatively high gear ratio, in a compact arrangement. However, planetary gearsets with multiple ring gears, sets of planet gears, etc. have been envisioned, which may add manufacturing complexity to the system.

A planetary support 146 schematically depicted in FIG. 1, described in greater detail herein with regard to FIGS. 2-4, may be used to support (e.g., radially, axially, and rotationally support) the planetary gearset and specifically ground the ring gear. It will be understood that the planetary support includes greater structural complexity than is depicted in FIG. 1 and is elaborated upon herein. The planetary support may be coupled to a gearbox housing 147, schematically depicted in FIG. 1. In this way, the planetary support 146 may be tailored to react forces from the planetary assembly rather than the gearbox housing. Consequently, loads from the planetary gearset may be carried by the planetary support rather than the gearbox housing. As a result, the structural complexity of the gearbox housing may be reduced, if wanted. Further, the gearbox housing 147 may at least partially surround a portion of the gears, shafts, mechanisms, and the like in gearbox 106. The gearbox housing 147 may also partially enclose the differential 145.

The differential 145 is designed to allow speed differentiation between axle shafts 134, 136, under some conditions. To that end, the differential 145 may include a case, spider gears, side gears, and the like, for example. Further, in certain examples, the differential may be a locking type or a limited slip type differential. However, the differential may be an open differential, in some instances, which may streamline manufacturing at the expense of traction, during some operating conditions, for instance. The axle shafts 134, 136 may be coupled to one or more drive wheels.

A control system 150 with a controller 152 may further be included in the vehicle 100 and/or axle system 102. The controller 152 includes a processor 154 and memory 156. The memory 156 may store instructions therein that when executed by the processor cause the controller 152 to perform the various methods, control strategies, etc., described herein. The processor 154 may include a microprocessor unit and/or other types of circuits. The memory 156 may include known data storage mediums such as random access memory, read only memory, keep alive memory, combinations thereof, etc. Further, the memory 156 may include non-transitory memory.

The controller 152 may receive vehicle data from sensors positioned in different locations in the vehicle 100 and/or axle system 102. The sensors may include a motor speed sensor 160, shaft speed sensors 162, a parking mechanism sensor 164, wheel speed sensors, and the like.

The controller 152 may send control commands to an actuator in the shifting mechanism 138 and in response the clutch may be engaged or disengaged to alter the system's operating gear ratio. The other controllable components in the transmissions system include the electric machine 104, parking mechanism 140, the differential in the case of a controllable locking type differential, and the like. These controllable components may function similarly with regard to receiving control commands and adjusting an output and/or state of a component responsive to receiving the command via an actuator.

The vehicle 100 may include an input device 170 (e.g., an accelerator pedal, a gear selector, a gear stick, a controlstick, buttons, combinations thereof, and the like). The input device 170, responsive to operator input, may generate a gear shift request for transitioning between two of the available gears in the gearbox. Alternatively, the transmission system may automatically shift between two of the available gears responsive to changes in operator torque request, vehicle load, etc.

The shifting mechanism 138 may be commanded to selectively place the gear reduction 116 or the gear reduction 118 in the gearbox's power path. As such, the power path, in a first gear mode may travel through the input shaft 112, the gear reduction 116, the gear 142, the gear 143, the planetary gearset 144, the differential 145, and then the axle shafts 134, 136. Conversely, the power path in second gear mode may first travel through the input shaft 112 and then to the gear reduction 118, etc. In this way, gearbox adaptability may be increased and may enable the motor to be more efficiently operated, if wanted.

The active gear in the gearbox may be automatically determined based on vehicle operating conditions or selected by an operator through interaction with a gear selector. As such, the controller may determine whether or not shifting between the two gear modes is demanded. As such, the aforementioned shifting strategy may be carried out as instruction stored in memory 156 executable by the processor 154 in the controller.

An axis system is further provided in FIG. 1 as well as FIGS. 2-4 for reference. In one example, the z-axis may be parallel to a gravitational axis, the x-axis may be a lateral axis, and the y-axis may be a longitudinal axis. However, other orientations of the axes may be used, in other examples.

FIG. 2 shows a first example of an axle system 200. The axle system 200 again includes a planetary gearset, schematically depicted at 202. Although, the planetary gear set is schematically illustrated in FIG. 2, it will be appreciated that it is supported by a planetary support structure and may be coupled to a differential (e.g., a differential case). Further structural details of the planetary gear set and the support structure are expanded upon herein with regard to FIGS. 3-4. It will be appreciated that the axle system 200 shown in FIG. 2 may share common structural and/or functional features with the axle system 102, depicted in FIG. 1 and vice versa. Redundant description is therefore omitted for concision. FIG. 2 is approximately drawn to scale, although other relative dimensions may be used, in other embodiments.

The planetary gearset 202, schematically depicted in FIG. 2, may include a sun gear 350 with a central opening through which one of the axle shafts may extend. The planetary gearset 202 may further include a carrier on which a plurality of planet gears rotate as well as a ring gear.

The axle system 200 includes a planetary support 210 coupled to and grounding the ring gear of the planetary gearset 202. The planetary support 210 is shown including a bridge section 212 that extends between two opposing pillars 214. For the purpose of structural reinforcement, a rib may extend across the bridge section 212 which curves away from the rotational axis of the planetary gearset 202. The bridge's curvature allows the ring gear to be efficiently reinforced. The opposing pillars 214, 215 may be symmetrically arranged on a first and second side 220, 222 of the planetary support. Conceptually, the bridge may have a sombrero shape.

The planetary support 210 may further include recessed sections adjacent to the pillars 214, 215. Because of the recessed section location, the weight and size of the support may be reduced without unduly impacting the load carrying capacity of the support.

Further, the pillars 214, 215 may each include flanges 224 on opposing ends of the respective pillar. Accordingly, bolt heads or other suitable attachment device heads may seat on one side of the pillars. Bolts 228 or other suitable attachment devices (e.g., pins, screws, and the like) may extend through openings in the pillars 214, 215. Ribs, for the purpose of structural reinforcement, may extend lengthwise down the pillars. As depicted, the ribs may have a substantially constant thickness and/or widths along their length. However, ribs with varying thicknesses and/or widths along their length have been envisioned.

Further, in the illustrated example, the bolts 228 include a head on one side and a threaded section of the other side. The threaded section of the bolts may threadingly engage with openings in a gearbox housing 232. To form an interface between the ring gear 308, shown in FIG. 3, and the planetary support 210 splines, pins, bolts, welds, stakes, adhesive, an interference fit, combinations thereof, and the like may be utilized, which may simplify the system's assembly process. This interface 450 is schematically depicted in FIG. 4. The planetary support may further include recessed sections 233 positioned between an interior flange and the pillars 214, 215. These recessed sections allow the support's weight to be reduced.

Continuing with FIG. 2, to achieve the abovementioned structural features, the planetary support 210 may be at least partially constructed via machining. However, other suitable manufacturing techniques for the planetary support have been contemplated. Specifically, in one example, the gearbox housing 232 may be constructed out of a cast metal while, the planetary support 210 may be constructed using another manufacturing process such as machining, in one example. In this way, the support may achieve a more accurate profile than the gearbox housing, to decrease tolerances in the support and decrease the likelihood of misalignment of the support with regard to planetary assembly and/or the housing.

The gearbox housing 232 may partially enclose a differential. Further, the gearbox housing 232 may be constructed out of a cast metal, to decrease manufacturing costs when compared to other manufacturing techniques such as machining.

The planetary reduction may further include a sun gear that acts as an input which is coupled to a gear on an output shaft of the gearbox. Even further, the planetary reduction may include a carrier rotationally coupled to a differential case. In this way, the planetary gear reduction may achieve a relatively high gear ratio, if wanted.

Cutting plane A-A' corresponds to the cross-sectional view illustrated in FIG. 3 and cutting plane B-B' corresponds to the cross-sectional view illustrated in FIG. 4.

FIG. 3 depicts a first cross-sectional view of the axle system 200. The gearbox's output gear 300 is illustrated along with the planetary gearset 202 and the differential 204. A sun gear 350, the carrier 304, the planet gears 306, and the ring gear 308 are further illustrated in FIG. 3. The grounding of the ring gear is schematically illustrated. However, as previously discussed the ring gear may be grounded by the planetary support 210, depicted in FIG. 2.

The ring gear 308 may be positioned axially between the output gear 300 and the differential case 352. In this way, the axle system's compactness may be increased. However, alternate axle assembly layouts have been contemplated. Further, the output gear 300 may radially extend beyond and outer surface of the ring gear 308. This allows the output gear to be profiled for attachment to the sun gear 350.

The differential case 352, axle shafts 316, spider gears 310, and side gears 312 are depicted in FIG. 3. The carrier 304 is shown coupled (e.g., directly coupled) to one side of the differential case 352. In this way, the planetary assembly's output may be space efficiently attached to the differential case. Bearings 314 may be coupled to the case 352 and constrain rotation thereof. Axle shafts 316 may further be coupled to the side gears 312, as previously discussed. Bearing 318 may be coupled to the sun gear 350 and one of the side gears 312 to allow the sun gear to independently rotate with regard to the side gear. Further, bearing 321 may be included in the axle system. The bearing 321 may be coupled to the sun gear 350 and the differential case 352 and allows independent rotation therebetween. The sun gear may function as a planetary input. To realize the planetary input functionality, the sun gear may include an extension 319 coupled (e.g., directly coupled) to the output gear 300. The extension may axially traverse the length of the axle shaft away from the side gear. A bearing 320 (e.g., a needle bearing) may be provided between the axle shaft 316 and the sun gear 350 to allow rotation therebetween. The bearing 320 may enable a gap 323 between the axle shaft and the sun gear to be achieved to prevent unwanted interaction therebetween.

Bearing 322 may be coupled to the output gear 300 or the sun gear 350 to constrain rotation thereof. As described herein, a bearing, as described herein, may include races, roller elements (e.g., cylinders, balls, tapered cylinders, etc.), and the like to achieve the aforementioned functionality.

FIG. 4 shows a second cross-sectional view of the axle system 200 and specifically the planetary gearset 202, the planetary support 210, and the gearbox housing 232. The bolts 228 are shown extending through openings 400 in the pillars 214, 215. Further, the bolts may include threaded sections 402 at one end that threadingly engage threaded sections 404 in the gearbox housing 232. Further, as illustrated in FIG. 4, the bolt heads 405 seat on flanges 224. However, other suitable types of attachment devices or methods used to couple the support structure to the housing, may be used, in other examples. The face 451 of the housing 232 is shown contacting an inner surface 407 of the support 210. In this way, the support may be efficiently attached to the gearbox housing.

FIG. 4 again shows the sun gear 350, the planet gears 306 on the carrier 304, and the ring gear 308. The ring gear 308 may be press fit into an opening 406 in the planetary support 210, in one example. Alternatively, an outer surface 408 of the ring gear 308 may be splined and mate with an inner surface 410 of the planetary support 210. Additionally or alternatively, the ring gear may be coupled to the planetary support via welds, pins, bolts, combinations thereof, and the like. Thus, a splined or press fit interface may be formed between the planetary support and the ring gear. Using splines or an interference fit between the ring gear and the support may allow the manufacturing efficiency of the axle assembly to be increased. The inner surface of the planetary support may be machined to efficiently achieve a desired interference fit between the ring gear and the support. However, this interference fit may be achieved via other suitable manufacturing techniques.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an axle system is provided that comprises: a gearbox housing at least partially enclosing a gearbox; and a planetary gearset rotationally coupled to an output of the gearbox and positioned co-axial with a rotational axis of an axle shaft in a differential, wherein the planetary gearset comprises: a ring gear grounded by a planetary support; wherein the planetary support is coupled to the gearbox housing.

In another aspect, an electric axle system is provided that comprises: a gearbox housing at least partially enclosing a shiftable gearbox; and a planetary gearset rotationally coupled to an output of the gearbox and positioned co-axial with a rotational axis of an axle shaft in a differential, wherein the planetary gearset comprises: a ring gear grounded by a planetary support; wherein the planetary support is coupled to the gearbox housing via a plurality of attachment devices.

In any of the aspects or combinations of the aspects, the planetary support may include a bridge section that extends between two opposing pillars that include central openings and wherein the axle system further comprises attachment devices that extend through the central openings of the two opposing pillars.

In any of the aspects or combinations of the aspects, the ring gear may form an interference fit with the planetary support.

In any of the aspects or combinations of the aspects, the axle system may further comprise a splined interface formed between an outer surface of the ring gear and an interior surface of the planetary support.

In any of the aspects or combinations of the aspects, the gearbox housing may partially surround the differential.

In any of the aspects or combinations of the aspects, the gearbox housing may be constructed out of a cast metal.

In any of the aspects or combinations of the aspects, the gearbox may comprise: an input shaft rotationally coupled to an electric machine output; and an output shaft rotationally coupled to the ring gear.

In any of the aspects or combinations of the aspects, a rotational axis of the differential, a rotational axis of the electric machine, and rotational axes of the input shaft and the output shaft in the gearbox may be arranged parallel to one another.

In any of the aspects or combinations of the aspects, wherein the gearbox may comprise: a parking mechanism coupled to the output shaft; and a shifting mechanism activating a first gear reduction and a second gear reduction during different operating conditions.

In any of the aspects or combinations of the aspects, the electric machine may be an electric motor-generator.

In any of the aspects or combinations of the aspects, the output of the gearbox may be a gear coupled to an output shaft.

In any of the aspects or combinations of the aspects, the planetary gearset may be a simple planetary gearset that includes a sun gear coupled to an output gear of the gearbox.

In any of the aspects or combinations of the aspects, the planetary support may include two opposing pillars that include central openings and wherein the plurality of attachment devices extend through the central openings.

In any of the aspects or combinations of the aspects, the shiftable gearbox may include at least two selectable gear reductions and a shifting mechanism placing the shiftable gearbox in the two selectable gear reductions during different operating conditions.

In any of the aspects or combinations of the aspects, the shiftable gearbox may comprise: an input shaft rotationally coupled to an electric machine output; an output shaft rotationally coupled to the ring gear; and a parking mechanism coupled to the output shaft.

In any of the aspects or combinations of the aspects, the gearbox housing may partially surround the differential and wherein the gearbox housing is constructed out of a cast metal.

In any of the aspects or combinations of the aspects, the planetary gearset may be a simple planetary gearset with a sun gear coupled to a gearbox output and a carrier coupled to a case in the differential.

In any of the aspects or combinations of the aspects, the plurality of attachment devices may include two bolts positioned on opposing sides of the planetary gearset.

In any of the aspects or combinations of the aspects, the planetary support may include a curved bridge section that extends away from a face of the gearbox housing and wherein the gearbox housing may partially surround the differential.

In any of the aspects or combinations of the aspects, the ring gear may be coupled to the planetary support via one or more of an interference fit, a weld, a stake, a pin, and a bolt.

In another representation, an electric drive axle is provided. The electric drive axle comprises a simple planetary gearset with a ring gear directly coupled to and radially, axially, and rotationally supported by a planetary reinforcement structure with an arced section that is coupled to the ring gear via a press fit or splined interface. The simple planetary gearset further includes a carrier directly coupled to a case of a differential.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various axle system and/or vehicle configurations. The control methods and routines disclosed herein may be stored as executable instructions in non-transitory memory and may be carried out by the control system including the controller in combination with the various sensors, actuators, and other axle system and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "approximately" is construed to mean plus or minus five percent of the range, unless otherwise specified.

The invention claimed is:

1. An axle system, comprising:
a gearbox housing at least partially enclosing a gearbox; and
a planetary gearset rotationally coupled to an output of the gearbox and positioned co-axial with a rotational axis of an axle shaft in a differential, wherein the planetary gearset comprises:
 a ring gear grounded by a planetary support;
wherein the planetary support is coupled to the gearbox housing;
wherein the planetary support includes a bridge section that extends between two opposing pillars that include central openings; and
wherein the axle system further comprises attachment devices that extend through the central openings of the two opposing pillars.

2. The axle system of claim 1, wherein the ring gear is coupled to the planetary support via one or more of an interference fit, a weld, a stake, a pin, and a bolt.

3. The axle system of claim 1, further comprising a splined interface formed between an outer surface of the ring gear and an interior surface of the planetary support.

4. The axle system of claim 1, wherein the gearbox housing partially surrounds the differential.

5. The axle system of claim 1, wherein the gearbox housing is constructed out of a cast metal.

6. The axle system of claim 1, wherein the gearbox comprises:
an input shaft rotationally coupled to an electric machine output; and
an output shaft rotationally coupled to a sun gear in the planetary gearset.

7. The axle system of claim 6, wherein a rotational axis of the differential, a rotational axis of an electric machine, and rotational axes of the input shaft and the output shaft in the gearbox are arranged parallel to one another.

8. The axle system of claim 7, wherein the electric machine is an electric motor-generator.

9. The axle system of claim 6, wherein the gearbox comprises:
a parking mechanism coupled to the output shaft; and
a shifting mechanism designed to activate a first gear reduction and a second gear reduction during different operating conditions.

10. The axle system of claim 1, wherein the output of the gearbox is a gear coupled to an output shaft.

11. The axle system of claim 1, wherein the planetary gearset is a simple planetary gearset that includes a sun gear coupled to an output gear of the gearbox.

12. An electric axle system, comprising:
a gearbox housing at least partially enclosing a shiftable gearbox; and
a planetary gearset rotationally coupled to an output of the shiftable gearbox and positioned co-axial with a rotational axis of an axle shaft in a differential, wherein the planetary gearset comprises:
 a ring gear grounded by a planetary support;
wherein the planetary support is coupled to the gearbox housing via a plurality of attachment devices; and
wherein the planetary support includes two opposing pillars that include central openings and wherein the plurality of attachment devices extend through the central openings.

13. The electric axle system of claim 12, wherein the shiftable gearbox includes at least two selectable gears and a shifting mechanism designed to place the shiftable gearbox in the at least two selectable gears during different operating conditions.

14. The electric axle system of claim 13, wherein the shiftable gearbox comprises:
an input shaft rotationally coupled to an electric machine output;
an output shaft rotationally coupled to the ring geara sun gear in the planetary gearset; and
a parking mechanism coupled to the output shaft.

15. The electric axle system of claim 12, wherein:
the gearbox housing partially surrounds the differential; and
the gearbox housing is constructed out of a cast metal.

16. The electric axle system of claim 12, wherein the planetary gearset is a simple planetary gearset with a sun gear coupled to a gearbox output and a carrier coupled to a case in the differential.

17. The electric axle system of claim 12, wherein the plurality of attachment devices include two bolts positioned on opposing sides of the planetary gearset.

18. The electric axle system of claim 17, wherein:
the planetary support includes a curved bridge section that extends away from a face of the gearbox housing; and
the gearbox housing partially surrounds the differential.

* * * * *